Patented Sept. 25, 1951

2,568,744

UNITED STATES PATENT OFFICE 2,568,744

DEMULSIFICATION PROCESS AND COMPOSITION

Earl T. Kocher, Bellflower, Calif., assignor to Visco Products Company, Houston, Tex., a corporation of Delaware No Drawing. Application December 29, 1948, Serial No. 68,088

14 Claims. (Cl. 252—331)

This invention relates to new chemical compositions and to the art of resolving petroleum emulsions, more particularly petroleum emulsions of the oil-in-water type, encountered, for example, in the production, handling and refining of petroleum. These oil-in-water emulsions, or so-called reversed emulsions, occur frequently in the Williams and Mt. Poso Fields located in the San Joaquin Valley area of California and are occasionally encountered in other oil producing areas.

Oil field emulsions, for the most part, are of the water-in-oil type. The oil-in-water or reversed emulsions, to which the present invention is particularly directed, are frequently encountered, however, in the areas noted above. A reversed emulsion, as encountered in the oil fields, contains a small amount of oil, usually less than 1%, as the disperse phase, and its presence is denoted by the milky tinge which it imparts to the water, usually low in salt content. In the aforementioned areas, both types of emulsions are produced together, that is, the water which is the disperse phase in the normal water-in-oil emulsion is, in itself, an oil-in-water emulsion. Ordinary demulsifiers which resolve water-in-oil emulsions, have little or no effect on oil-in-water type emulsions. These latter emulsions have heretofore proven difficult to resolve and the recovery of the oil contained therein, which often means the difference between a successful and unsuccessful operation, has presented many problems.

One of the objects of the invention is to provide new and useful chemical compositions.

Another object of the invention is to provide a new and improved process for separating petroleum emulsions into their component parts, i. e., oil and water.

A further object of the invention is to provide a process for the resolution of emulsions encountered outside oil fields, as, for example, water in the hold of a ship contaminated with oil. In such cases clarification of the water prior to disposal in a harbor or bay area may be effected by the method herein described. Likewise, the process of the present invention may be employed in various other cases where separation of emulsions into their component parts is desired.

Further objects will appear from the following descriptions in which the reagents and the processes for their employment relate to the treatment of petroleum emulsions.

It has been discovered that petroleum emulsions, and particularly the reversed oil-in-water emulsions, may be readily and quickly resolved into their component parts by the use of the compositions disclosed herein. Further, the investigation shows that after treatment the water discharged from the gun barrel and settling tanks has excellent clarity, and the recovered oil is homogeneous, e. g., free from flocculent materials obtained when inorganic electrolytes such as calcium chloride and/or zinc chloride with or without protective colloids are used. In some instances, it has been found to be preferable to treat a mixture containing both types of emulsions by a single fluid containing a composition of the present invention and an additional substance adapted to resolve the normal water-in-oil emulsions, where the chemicals for the different emulsions are compatible.

According to the invention, it has been found that new and improved results are obtained in resolving reversed emulsions by employing molecularly dehydrated condensation products of the reaction of zinc chloride and the residue remaining from the reaction of an alkylene oxide having at least two carbon atoms and ammonia after the removal of the monoamines in which the molar ratio of alkylene oxide to nitrogen does not exceed 3:1.

As will hereinafter be explained, these substances are utilized in the preparation of the demulsifying agents described herein, and various combinations and orders of reacting the various chemicals are contemplated as will be seen from the following discussion.

For the purposes of this invention, the molecularly dehydrated product is preferably, at least partially, neutralized with an acid.

Alkylolamines are prepared in general by reacting the alkylene oxides, e. g., ethylene, isopropylene, and isobutylene oxides with ammonia. These reactions are exothermic and an operating temperature of 50 degrees C. to 60 degrees C. is usually satisfactory. If technical 28% aqueous ammonia is employed, primary, secondary and tertiary amines are obtained in varying proportions, dependent entirely on the alkylene oxide-ammonia ratio. In rectification of the reaction mixture the various amines are separated by distillation. The tertiary alkylolamine, being the highest boiling member, comes over last. In commercial operations there is a gradual accumulation of still bottoms or still residues consisting of materials having boiling points above 280 degrees C. at atmospheric pressures and considerably in excess of the corresponding tertiary alkylolamine. There is no authentic information as to the constitution of these residues.

The preferred alkylene oxide-ammonia reaction product employed as a starting material is derived from the manufacture of commercial triethanolamine by the reaction of ethylene oxide and ammonia. The material is a dark, very viscous, hygroscopic liquid which boils above 244 degrees C. at 50 mm.

The manufacture of the following primary, secondary and tertiary alkylolamines from alkylene oxides and ammonia results in the formation of still residues which would be suitable for the purpose of the invention: diethanolamine, octylethanolamine, cyclohexylethanolamine, dipropanolamine, propylpropanolamine, benzylethanolamine, propyldiethanolamine, tripropanolamine, methyldipropanolamine, cyclohexyldiethanolamine, ethyldicyclohexanolamine, trihexanolamine, 2-amino-2-methyl-1-propanol, octadecyldiethanolamine, and polyethanolamine.

The modification of the alkylene oxide-ammonia residue results in a substantially more viscous or thickened material which retains its characteristic solubility in water and alcohol and an increased solubility in hydrocarbon over the parent residue. The modified products are more alkaline than the tertiary alkylolamine which has been removed from the reaction mixture and possess unusual properties.

It will be understood that it is not desired to be limited by the above listing for other obvious equivalents to those skilled in the art may be employed to produce materials of the kind contemplated within the scope of this invention.

A resolving agent of the type herein described may be applied to the material to be demulsified in any of the suitable ways well known to those skilled in the art. Specifically, it may be injected in a single small stream, either continuous or intermittent, at short intervals into the flow line of the oil well by means of a force feed pump. Or it may be added manually to the fluid in a gun barrel, using agitation with gas to secure thorough mixing. As prepared by the procedures herein outlined, it is occasionally somewhat too concentrated, or viscous, or both, for convenient handling in commercial proportioning pumps, but it may readily be diluted with any suitable diluent employed as an intermediate vehicle. It is possible to secure effective resolving action by the addition of very small amounts of a resolving agent within a range from about 0.05% to as low as 0.0004% by weight of the emulsion to which the resolving agent is added.

In order to illustrate specifically the materials employed in the new process described herein for use in accordance with the present invention, the following examples are set forth below as being typical of products suitable for use in this process. It is to be understood, however, that the invention is not confined to the specific chemicals or proportions thereof set forth in these examples as it will be obvious that equivalents of these chemicals and other proportions may be used without departing from the spirit of this invention and the scope of the appended claims. Unless otherwise indicated, the quantities are stated in parts by weight.

*Example I*

In a reaction vessel, 750 parts of ethylene oxide-ammonia still residue sold under the trade names Amine Residue T and Polyamine T (Carbide and Carbon Chemicals Corporation) and 25 parts of technical zinc chloride were heated with vigorous stirring. At a temperature of 202 degree C. an aqueous distillate began to form and the heating was continued until 80 parts of an aqueous distillate had been secured. This operation required 5½ hours at a temperature in excess of 200 degrees C. After cooling to approximately 100 degrees C. 550 parts of water were added to yield the final product.

*Example II*

To 300 parts of the material as prepared in Example I 15 parts of muriatic acid was added with stirring until partial neutralization had been secured.

*Example III*

The partial neutralization of 300 parts of the material as prepared in Example I was accomplished by adding 30 parts of muriatic acid.

*Example IV*

In a reaction vessel, 750 parts of a still residue as described in Example I was heated to 100 degrees C. and at that point 55 parts of technical zinc chloride added. The temperature was raised with stirring and 80 parts of an aqueous distillate was secured, beginning at 204 degrees C. and ending at a final temperature of 257 degrees C. After cooling to approximately 100 degrees C., 550 parts of water was added to yield the completed product.

*Example V*

The partial neutralization of 300 parts of the material as prepared in Example IV was accomplished by adding 15 parts of muriatic acid.

*Example VI*

The partial neutralization of 300 parts of the material as prepared in Example IV was accomplished by adding 30 parts of muriatic acid.

*Example VII*

In a reaction vessel, 750 parts of a still residue as described in Example I was heated to 100 degrees C. and at this point 80 parts of technical zinc chloride was added. At 187 degrees C. an aqueous distillate began to form and a total of 89 parts was secured in about 3 hours at a maximum temperature of 231 degrees C. After cooling the reaction mass to approximately 100 degrees C., 550 parts of water was added to yield the finished product.

*Example VIII*

The partial neutralization of 300 parts of the material as prepared in Example VII was accomplished by adding 15 parts of muriatic acid.

*Example IX*

The partial neutralization of 300 parts of the material as prepared in Example VII was accomplished by adding 30 parts of muriatic acid.

In the foregoing examples ordinary tap water served as a solvent. Other suitable solvents are isopropyl alcohol, ethylene glycol and homologous water-miscible alcohol ethers.

From the evaluation of many products made in accordance with the description herein the following conclusions can be made. A maximum emulsion resolution was secured when technical zinc chloride was employed in the range of 7% to 10% by weight of the alkylolamine residue. Good results were obtained with zinc chloride condensation products derived with 5% to 7% by weight of zinc chloride. The results with products derived with less than 5% by weight of zinc chloride were only fair. A concentration of zinc chloride higher than about 10% resulted in a non-compatible composition with the resulting insoluble portion amounting to about 33% to 50% of the reaction mass. The insoluble portion can be reduced by partial neutralization but cannot be eliminated. Examples VII, VIII and IX illustrate reaction products which are operable for breaking reversed emulsions but physically objectionable because of the high percentage of zinc chloride. Comparatively poor results in breaking reversed emulsions were secured in those compositions in which the zinc chloride was used in a concentration less than 3% by weight of the alkylolamine residue.

By and large partial neutralization improved the emulsion resolution efficiency. Maximum efficiency was noted at about 10% mineral acid with 5% mineral acid showing somewhat decreased efficiency. The unneutralized materials, however, have substantial demulsifying characteristics and will resolve oil-in-water emulsions, or so-called reversed emulsions. These are general conclusions based on observations covering tests made on many emulsions.

Various examples of the many products which answer the descriptions herein made are contemplated. Some of the products may be oil soluble, others water soluble. In many instances they may possess dual solubility to an appreciable extent. Even apparent insolubility is of no consequence, as the products are all soluble at least to the extent necessary for segregation at the emulsion interface as a water wettable colloid. The suitability of many of these products to the breaking and resolving of any given emulsion can readily be determined by the conventional procedures now in general use in oil fields and in laboratories which make such determinations.

The invention is hereby claimed as follows:

1. A process for the resolution of oil-in-water emulsions which comprises subjecting an oil-in-water emulsion to the action of a molecularly dehydrated condensation product of the reaction of 3% to about 10% by weight of zinc chloride and the residue remaining from the reaction of an alkylene oxide having at least two carbon atoms and ammonia after the removal of monoamines in which the ratio of alkylene oxide to nitrogen does not exceed 3:1.

2. A process for the resolution of oil-in-water emulsions which comprises subjecting an oil-in-water emulsion to the action of a molecularly dehydrated condensation product of the reaction of 3% to about 10% by weight of zinc chloride and the residue remaining from the reaction of ethylene oxide and ammonia after the removal of monoamines in which the ratio of ethylene oxide to nitrogen does not exceed 3:1.

3. A process for the resolution of oil-in-water emulsions which comprises subjecting an oil-in-water emulsion to the action of a molecularly dehydrated condensation product of the reaction of 7% to 10% by weight of zinc chloride and the residue remaining from the reaction of an alkylene oxide having at least two carbon atoms and ammonia after the removal of monoamines in which the ratio of alkylene oxide to nitrogen does not exceed 3:1.

4. A process for the resolution of oil-in-water emulsions which comprises subjecting an oil-in-water emulsion to the action of a molecularly dehydrated condensation product of the reaction of 7% to 10% by weight of zinc chloride and the residue remaining from the reaction of ethylene oxide and ammonia after the removal of monoamines in which the ratio of ethylene oxide to nitrogen does not exceed 3:1.

5. A process for the resolution of oil-in-water emulsions which comprises subjecting an oil-in-water emulsion to the action of a molecularly dehydrated condensation product of the reaction of 3% to about 10% by weight of zinc chloride and the residue remaining from the reaction of an alkylene oxide having at least two carbon atoms and ammonia after the removal of monoamines in which the ratio of alkylene oxide to nitrogen does not exceed 3:1, at least partially neutralized with an acid.

6. A process for the resolution of oil-in-water emulsions which comprises subjecting an oil-in-water emulsion to the action of a molecularly dehydrated condensation product of the reaction of 3% to about 10% by weight of zinc chloride and the residue remaining from the reaction of ethylene oxide and ammonia after the removal of monoamines in which the ratio of ethylene oxide to nitrogen does not exceed 3:1, at least partially neutralized with an acid.

7. A process for the resolution of oil-in-water emulsions which comprises subjecting an oil-in-water emulsion of the type found in San Joaquin Valley of California to the action of a molecularly dehydrated condensation product of the reaction of 3% to about 10% by weight of zinc chloride and the residue remaining from the reaction of an alkylene oxide having at least two carbon atoms and ammonia after the removal of monoamines in which the ratio of alkylene oxide to nitrogen does not exceed 3:1.

8. A molecularly dehydrated condensation product of the reaction of zinc chloride and the residue remaining from the reaction of an alkylene oxide having at least two carbon atoms and ammonia after the removal of the monoamines in which the molar ratio of alkylene oxide to nitrogen does not exceed 3:1.

9. A molecularly dehydrated condensation product of the reaction of 3% to about 10% by weight of zinc chloride and the residue remaining from the reaction of an alkylene oxide having at least two carbon atoms and ammonia after removal of the monoamines in which the molar ratio of alkllene oxide to nitrogen does not exceed 3:1.

10. A molecularly dehydrated condensation product of the reaction of 3% to about 10% by weight of zinc chloride and the residue remaining from the reaction of an alklene oxide having at least two carbon atoms and ammonia after the removal of the monoamines in which the molar ratio of alkylene oxide to nitrogen does not exceed 3:1, at least partially neutralized with an acid.

11. A molecularly dehydrated condensation product of the reaction of 7% to 10% by weight of zinc chloride and the residue remaining from the reaction of an alkylene oxide having at least two carbon atoms and ammonia after the removal of the monoamines in which the molar ratio of alkylene oxide to nitrogen does not exceed 3:1.

12. A molecularly dehydrated condensation product of the reaction of 3% to about 10% by weight of zinc chloride and the residue remaining from the reaction of ethylene oxide and ammonia after the removal of the monoamines in which the molar ratio of ethylene oxide to nitrogen does not exceed 3:1.

13. A molecularly dehydrated condensation product of the reaction of 7% to 10% by weight of zinc chloride and the residue remaining from the reaction of alkylene oxide having at least two carbon atoms and ammonia after the removal of the monoamines in which the molar ratio of alkylene oxide to nitrogen does not exceed 3:1, at least partially neutralized with an acid.

14. A molecularly dehydrated condensation product of the reaction of 7% to 10% by weight of zinc chloride and the residue remaining from the reaction of ethylene oxide and ammonia after the removal of the monoamines in which the molar ratio of ethylene oxide to nitrogen does not exceed 3:1.

EARL T. KOCHER.

REFERENCES CITED

The following references are of record in the file of this patent:

UNITED STATES PATENTS

| Number | Name | Date |
| --- | --- | --- |
| 2,051,486 | Kautter | Aug. 18, 1936 |
| 2,206,928 | Ulrich | July 9, 1940 |
| 2,407,985 | Monson et al. | Sept. 17, 1946 |
| 2,422,177 | Blair, Jr. | June 17, 1947 |

OTHER REFERENCES

Felice Garelli & Angelo Tetamanzi: "The Reaction of Triethylolamine & Metallic Salts," Gazzetta Chemica Italiana, vol. 64, page 478, 1934.